United States Patent
Terada et al.

(10) Patent No.: US 6,836,049 B2
(45) Date of Patent: Dec. 28, 2004

(54) COMMUTATOR HAVING SHORT-CIRCUITING PARTS, MOTOR HAVING SUCH A COMMUTATOR AND METHOD FOR MANUFACTURING SUCH A COMMUTATOR

(75) Inventors: Yuuichi Terada, Kosai (JP); Kazunobu Kanno, Kosai (JP); Toshio Yamamoto, Kosai (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 10/725,314

(22) Filed: Dec. 2, 2003

(65) Prior Publication Data

US 2004/0108787 A1 Jun. 10, 2004

(30) Foreign Application Priority Data

Dec. 4, 2002 (JP) ........................................ 2002-352888

(51) Int. Cl.[7] .............................................. H01R 39/04
(52) U.S. Cl. ...................................... 310/233; 310/236
(58) Field of Search ................................ 310/233–237, 310/127–151

(56) References Cited

U.S. PATENT DOCUMENTS

| | | | | |
|---|---|---|---|---|
| 2,672,564 A | * | 3/1954 | Krasno | 310/46 |
| 3,535,776 A | * | 10/1970 | De Luca | 29/597 |
| 4,019,076 A | * | 4/1977 | Bates | 310/233 |
| 5,982,072 A | * | 11/1999 | Sung | 310/239 |
| 6,057,623 A | * | 5/2000 | Tanaka et al. | 310/206 |
| 6,057,626 A | * | 5/2000 | Tanaka et al. | 310/233 |
| 6,236,137 B1 | | 5/2001 | Tanaka et al. | 310/233 |
| 6,285,106 B1 | * | 9/2001 | Oki | 310/233 |
| 2001/0038252 A1 | | 11/2001 | Yamamoto et al. | 310/207 |
| 2002/0121831 A1 | | 9/2002 | Egawa et al. | 310/216 |

FOREIGN PATENT DOCUMENTS

| | | |
|---|---|---|
| JP | A-04-150755 | 5/1992 |
| JP | A-11-187622 | 7/1999 |

* cited by examiner

*Primary Examiner*—Dang Le
(74) *Attorney, Agent, or Firm*—Posz & Bethards, PLC (57) ABSTRACT

Commutator segments are divided into a plurality of groups, each of which includes two or more of the commutator segments. Generally planar short-circuiting parts are respectively provided to the groups of the commutator segments and are located radially inward of the commutator segments in such a manner that the short-circuiting parts are spaced one after the other in an axial direction of the commutator. Each short-circuiting part is seamlessly and integrally formed with and is electrically connected to a corresponding sub-element of each commutator segment of a corresponding one of the groups of the commutator segments, and at least one of the short-circuiting parts is located within an axial extent of at least one of power supply brushes measured in the axial direction of the commutator. A dielectric body securely holds each commutator segment and each short-circuiting part.

14 Claims, 8 Drawing Sheets

FIG. 13

COMMUTATOR HAVING SHORT-CIRCUITING PARTS, MOTOR HAVING SUCH A COMMUTATOR AND METHOD FOR MANUFACTURING SUCH A COMMUTATOR

CROSS REFERENCE TO RELATED APPLICATION

This application is based on and incorporates herein by reference Japanese Patent Application No. 2002-352888 filed on Dec. 4, 2002.

BACKGROUND OF THE INVENTION

1. Field of the Invention

The present invention relates to a commutator, a motor having the commutator and a manufacturing method of the commutator.

2. Description of Related Art

Some previously proposed electric motors have a commutator that includes a plurality of commutator segments that are slidably engaged with power supply brushes and are divided into a plurality of groups, each of which includes two or more of the commutator segments electrically connected together to shortcircuit therebetween. In such a motor, electric current is supplied not only to the directly contacting commutator segments, which directly contact the power supply brushes, but also to the indirectly contacting commutator segments, which indirectly contact the power supply brushes through one of the directly contacting commutator segments. Such an arrangement allows a reduction in the number of the power supply brushes.

In some cases, the electrical connection of the commutator segments included in each group is achieved by short-circuiting wires, which interconnect the commutator segments of each group. In other cases, the electrical connection of the commutator segments included in each group is achieved by bypassing armature winding coils, which are wound around a core of the motor, to the corresponding commutator segments.

Furthermore, Japanese Unexamined Patent Publication No. 2001-320862, which corresponds to U.S. Patent Application Publication No. US 2001/0038252 A1, discloses another technique for electrically interconnecting the commutator segments of each group of the commutator. Here, an equalizer assembly, i.e., a sort-circuiting assembly, which includes a plurality of terminals for electrically connecting the commutator segments of the respective groups, is arranged next to the commutator segments in the axial direction. However, this arrangement disadvantageously causes an increase in a size of the motor since the equalizer assembly requires additional axial space in the motor.

Also, Japanese Unexamined Patent Publication No. 11-187622 discloses another technique for electrically interconnecting the commutator segments of each group. Here, a plurality of short-circuiting parts is provided in a commutator. Each short-circuiting part interconnects between corresponding two commutator segments and is formed integrally with the two commutator segments. More specifically, at one axial end of the commutator, one end of one of the two commutator segments is connected to one end of the other one of the two commutator segments by the short-circuiting-part. The short-circuiting part is bent in the axial direction of the commutator and is then bent in a circumferential direction of the commutator and is bent in the axial direction of the commutator once again to connect the ends of the two commutator segments, which are located in the same axial end of the commutator. An axial extent of one of the short-circuiting parts differs from another one of the short-circuiting parts to avoid short-circuiting between these short-circuiting parts. However, this arrangement requires advance preparation of different pairs of commutator segments, each of which has a short-circuiting part of a different axial extent. This causes an increase in types of components of the commutator and causes an increase in a manufacturing cost or causes an increase in manufacturing time.

SUMMARY OF THE INVENTION

The present invention addresses the above disadvantages. Thus, it is an objective of the present invention to provide a commutator having a minimized number of components and a minimized axial size. It is another objective of the present invention to provide a motor having such a commutator. It is another objective of the present invention to provide a method for manufacturing such a commutator.

To achieve the objectives of the present invention, there is provided a commutator for an electric motor that includes a plurality of power supply brushes, which are slidably engaged with the commutator. The commutator includes a plurality of conductive commutator segments, a plurality of generally planar short-circuiting parts and a dielectric body. The conductive commutator segments are arranged at generally equal angular intervals in a circumferential direction of the commutator. The commutator segments are divided into a plurality of groups, each of which includes two or more of the commutator segments. The generally planar short-circuiting parts are respectively provided to the groups of the commutator segments and are located radially inward of the commutator segments in such a manner that the short-circuiting parts are spaced one after the other in an axial direction of the commutator. Each short-circuiting part is seamlessly and integrally formed with and is electrically connected to at least a portion of each commutator segment of a corresponding one of the groups of the commutator segments. At least one of the short-circuiting parts is located within an axial extent of at least one of the power supply brushes measured in the axial direction of the commutator. The dielectric body securely holds each commutator segment and each short-circuiting part.

To achieve the objectives of the present invention, there is provided an electric motor that includes a stator, a rotor and a plurality of power supply brushes. The stator includes a plurality of field poles. The rotor is rotatable relative to the field poles and includes the above-described commutator. The power supply brushes are slidably engaged with the commutator.

To achieve the objectives of the present invention, there is provided a method for manufacturing a commutator that includes a plurality of commutator segments arranged at generally equal angular intervals. In the method, a plurality of conductive blank plate members is stacked in such a manner that the blank plate members are circumferentially displaced from one another by a predetermined angle. Each blank plate member includes an annular part and a short circuiting part, and the short circuiting part is located radially inward of the annular part and is connected to a plurality of points of the annular part, which are arranged at generally equal angular intervals in the circumferential direction of the annular part. Then, a dielectric material in a liquid phase is filled in a space defined radially inward of the annular parts of the blank plate members. Thereafter, the dielectric material is solidified. Next, the annular part of each blank plate member is radially cut at a plurality of predetermined cut points, which are circumferentially arranged at generally equal angular intervals, to divide the annular part of the blank plate member into a plurality of portions, each of which serves as a sub-element of a corresponding one of the commutator segments.

BRIEF DESCRIPTION OF THE DRAWINGS

The invention, together with additional objectives, features and advantages thereof, will be best understood from the following description, the appended claims and the accompanying drawings in which:

EMBODIMENT

Figure 1:
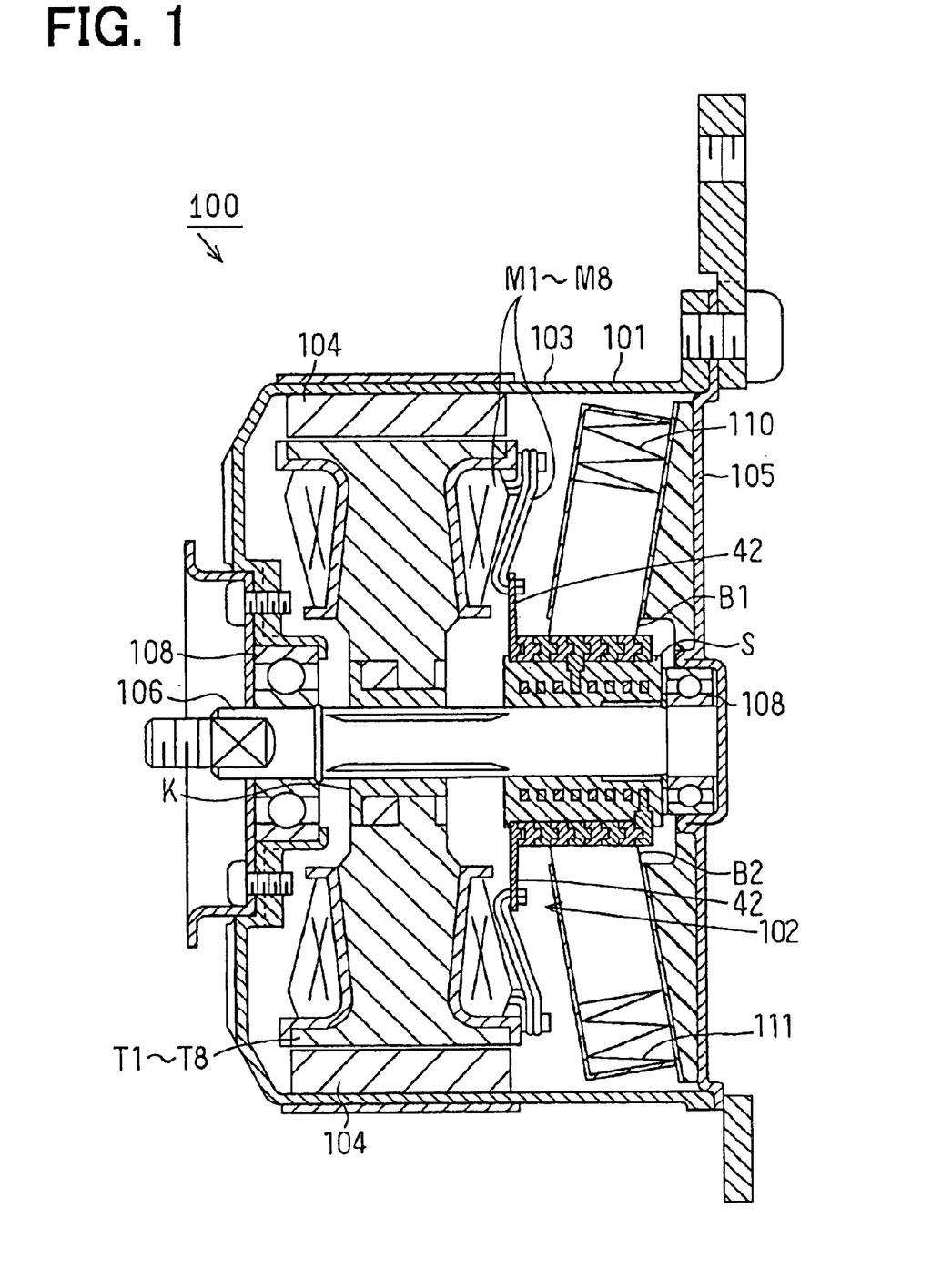
FIG. 1 is a schematic cross sectional view of a motor according to an embodiment of the present invention.

A motor according to an embodiment of the present invention will be described with reference to the accompanying drawings. With reference to FIG. 1, the motor 100 includes a stator 101 and an armature (rotor) 102. The stator 101 includes a yoke (yoke housing) 103 and a plurality (six in this embodiment) of permanent magnets (field poles) 104. The yoke 103 is formed as a cup shape body, and an opening of the yoke 103 is covered with an end frame 105. The magnets 104 are secured to an inner peripheral surface of the yoke 103. In the present embodiment, the magnets 104 are circumferentially arranged at equal angular intervals such that three N-pole magnets and three S-pole magnets are alternately arranged in the circumferential direction of the yoke 103. Such an arrangement of the permanent magnets 104 are disclosed in, for example, U.S. Patent Publication No. US 2002/0121831 A1, which is entirely incorporated by reference herein.

The armature 102 includes a rotatable shaft 106, a core K and a commutator S. Ends of the rotatable shaft 106 are rotatably supported by bearings 108. The core K is secured to a center of the rotatable shaft 106 and serves as a rotor core. The commutator S is secured to one end of the rotatable shaft 106. Two power supply brushes (anode-side power supply brush and cathode-side power supply brush) B1, B2 are urged against the commutator S by a corresponding spring 110, 111, so that the power supply brushes B1, B2 are slidably engaged with the commutator S. The core K includes a plurality of teeth T1–T8. Coils (armature winding coils) M1–M8 are wound around the corresponding teeth T1–T8 and are connected to the commutator S.

Figure 2:
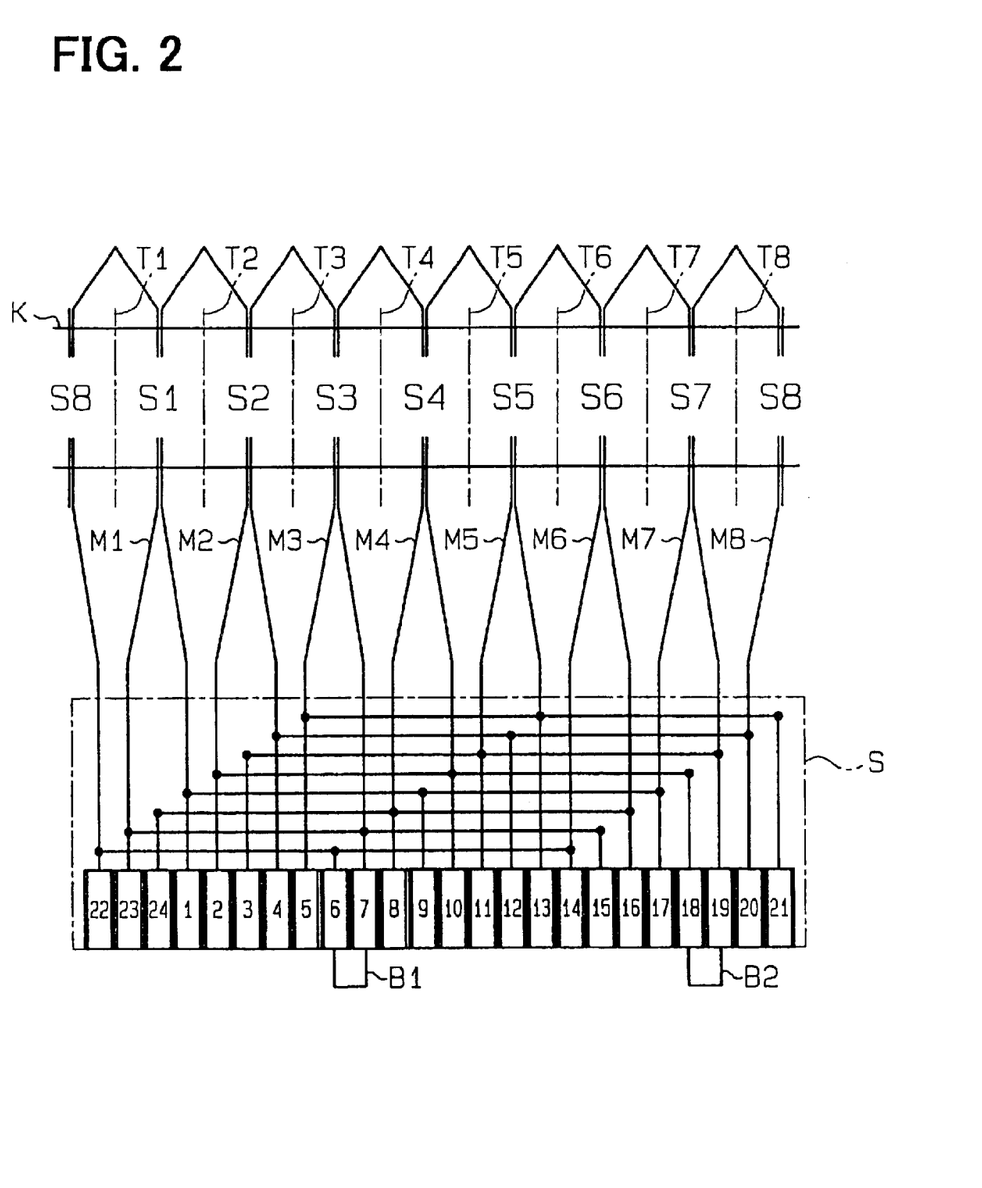
FIG. 2 is a schematic deployed view of a rotor of the motor.

FIG. 2 is a schematic deployed view of the rotor (armature) 102. In this embodiment, the number of the teeth T1–T8 is eight, and slots S1–S8 are respectively defined between corresponding two of the teeth T1–T8. The coils M1–M8 are wound around the teeth T1–T8 through the slots S1–S2. The commutator S is connected to ends of each coil M1–M8.

Next, a structure of the commutator S and a manufacturing method of the commutator S will be described.

Figure 3:
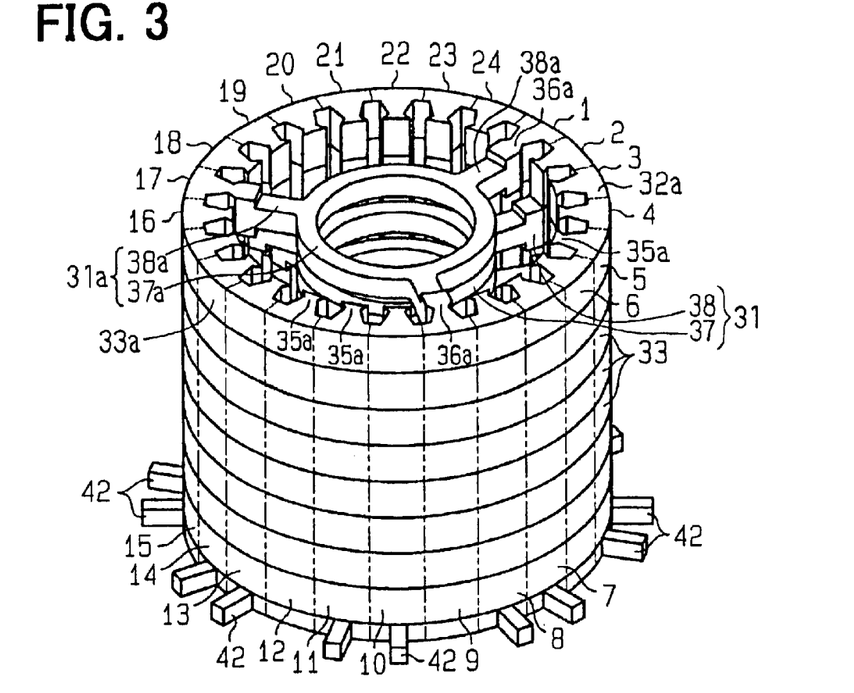
FIG. 3 is a schematic perspective view showing assembled commutator before filling of resin and cutting of the commutator.
Figure 4:
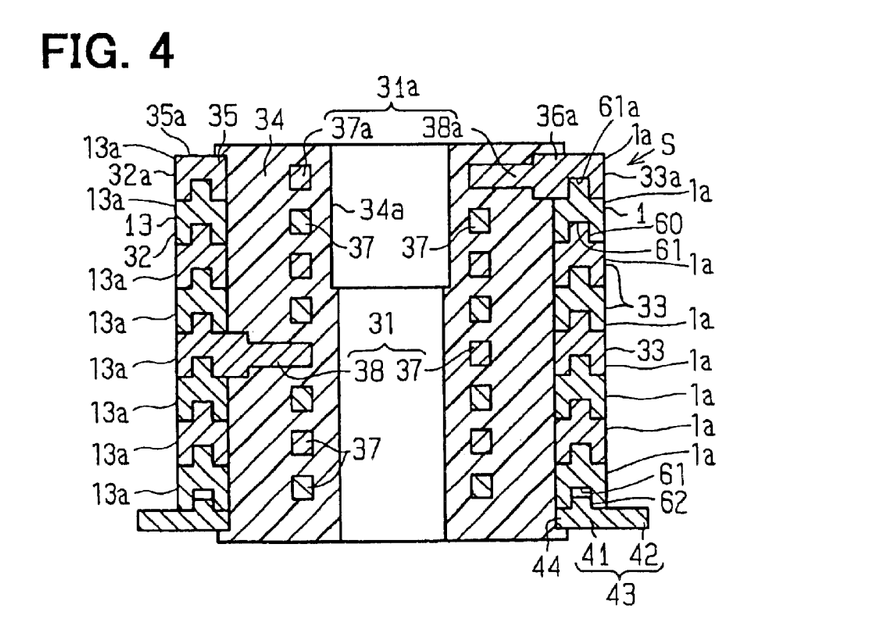
FIG. 4 is a cross sectional view showing the commutator with the filled resin.

With reference to FIGS. 3 and 4, the commutator S includes a plurality of commutator segments 1–24 and a plurality of generally planar short-circuiting parts 31, 31a. In the present embodiment, the number of the commutator segments 1–24 is twenty four, and only two of the commutator segments 1–24 are depicted in FIG. 4. As shown in FIG. 2, the commutator segments 1–24 are divided into eight groups, each of which includes three commutator segments 1–24 interconnected by a corresponding one of the short-circuiting parts 31, 31a. Each short-circuiting part 31, 31a is seamlessly and integrally formed with and is electrically connected to a corresponding one of sub-elements (only the sub-elements 1a and 13a of the segments 1 and 13 are shown in FIG. 4) of each of the corresponding three commutator segments 1–24 (see FIG. 2 for electrical connections of the segments 1–24). The commutator segments 1–24 are formed as follows. First, a plurality of conductive blank plate members 33, 33a (FIGS. 5A–6B), each of which includes an annular part 32, 32a and the short-circuiting part 31, 31a, is stacked up and secured together in an axial direction of the commutator S. In the present embodiment, the blank plate members 33, 33a include seven blank plate members 33 of a first type, and one blank plate member 33a of a second type. The seven blank plate members 33 of the first type are stacked up, and the blank plate member 33a of the second type is placed over and is secured to the top one of the blank plate members 33 of the first type, as shown in FIG. 3. The short-circuiting part 31, 31a of each blank plate member 33, 33a is connected to a plurality (three in this embodiment) of points of the annular part 32, 32a, which are arranged at predetermined angular intervals along an inner peripheral surface of the annular part 32, 32a in the circumferential direction. Then, a conductive connecting plate member 43, which has an annular part 41 (FIG. 7A) is placed below and is secured to the lowest one of the blank plate members 33, as shown in FIGS. 3 and 4. Then, as shown in FIG. 4, resin 34, which serves as a dielectric material (also referred to as a dielectric body), is provided in a space defined radially inward of the annular parts 32, 32a of the blank plate members 33, 33a and radially inward of the annular part 41 of the connecting plate member 43. Thereafter, the annular parts 32, 32a, 41 are radially cut at a plurality of predetermined cut points (twenty four points in the present embodiment), which are circumferentially arranged at generally equal angular intervals, to divide the annular parts 32, 32a, 41 into a plurality of portions. The divided portions of the annular parts 32, 32a of the blank plate members 33, 33a serve as the sub-elements (only the sub-elements 1a, 13a are shown in FIG. 4) of the commutator segments 1–24.

Figure 5A:
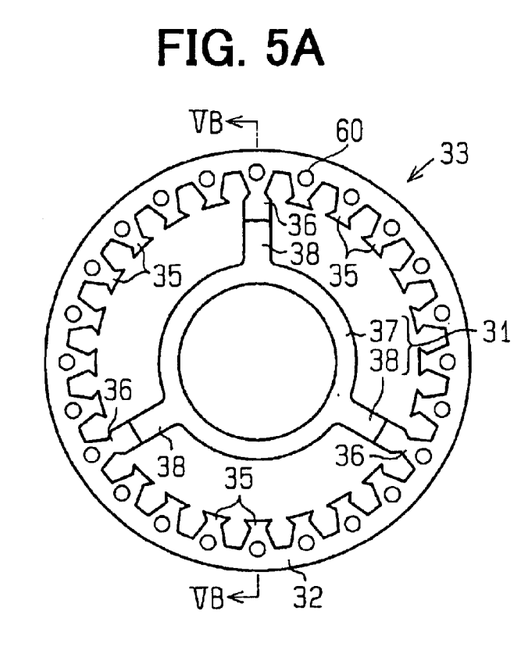
FIG. 5A is a plan view of a blank plate member of a first type of the commutator.
Figure 5B:
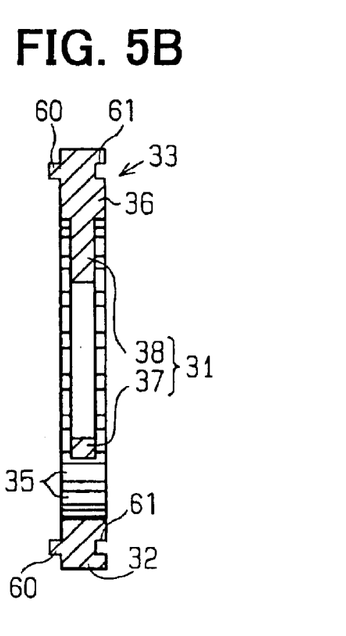
FIG. 5B is a cross sectional view along line VB—VB in FIG. 5A.
Figure 6A:
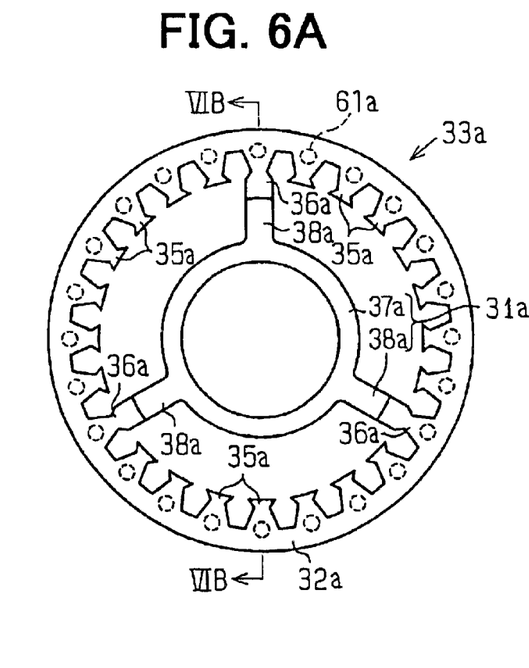
FIG. 6A is a plan view of a blank plate member of second type of the commutator.
Figure 6B:
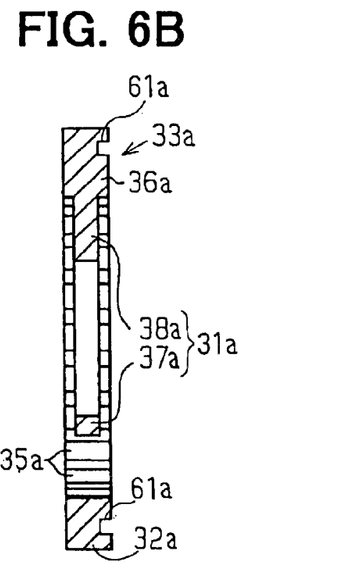
FIG. 6B is a cross sectional view along line VIB—VIB in FIG. 6A.

More specifically, as shown in FIGS. 5A to 6B, twenty four anchoring portions 35, 35a, 36, 36a are formed at equal angular intervals in an inner peripheral region of the annular part 32, 32a of each blank plate member 33, 33a. The anchoring portions 35, 35a, 36, 36a are anchored to the resin 34 to limit detachment of the divided portions (the commutator segments 1–24) from the resin 34 upon cutting of the annular part 32, 32a along dot-dot-dash lines (the dot-dot-dash lines also serve to show cut grooves made after cutting along the dot-dot-dash lines) in FIG. 3 to form these portions after providing the resin 34 in the space defined radially inward of the annular parts 32, 32a. Each short-circuiting part 31, 31a includes a small diameter portion 37, 37a and a plurality (three in this embodiment) of connecting portions 38, 38a. The small diameter portion 37, 37a is formed into an annular shape that has an outer diameter smaller than an inner diameter of the annular part 32, 32a. Each connecting portion 38, 38a extends radially outward from the small diameter portion 37, 37a and is connected to the inner peripheral surface of the annular part 32, 32a. The three connecting portions 38, 38a are arranged at 120 degree intervals and are connected to the corresponding three predetermined anchoring portions 36, 36a, respectively, which are arranged once every eight anchoring portions 35, 35a, 36, 36a, i.e., are arranged at three inner peripheral points of the annular part 32, 32a arranged at 120 degree intervals. As shown in FIGS. 5B and 6B, an axial thickness of the short-circuiting part 31, 31a of each blank plate member 33, 33a is smaller than an axial thickness of the annular part 32, 32a of the blank plate member 33, 33a. Furthermore, each blank plate member 33, 33a is blanked out from a plate material (not shown). With reference to FIGS. 5A and 5B, each blank plate member 33 of the first type includes twenty four axial projections 60 in one of the axially opposed end surfaces and also includes twenty four axial recesses 61 in the other one of the axially opposed end surfaces. The projections 60 are arranged at equal angular intervals and are provided to the anchoring portions 35, 36, respectively, and the recesses 61 are axially opposed to the projections 60, respectively. With reference to FIGS. 6A and 6B, the blank plate member 33a of the second type includes twenty four axial recesses 61a in one of the axially opposed end surfaces of the blank plate member 33a, which faces the adjacent blank plate member 33 of the first type. The recesses 61a are provided to the anchoring portions 35a, 36a, respectively. Unlike the blank plate members 33 of the first type, the other one of the axially opposed end surfaces of the blank plate member 33a of the second type is smooth and has no axial projection, as shown in FIG. 6B.

Figure 8A:
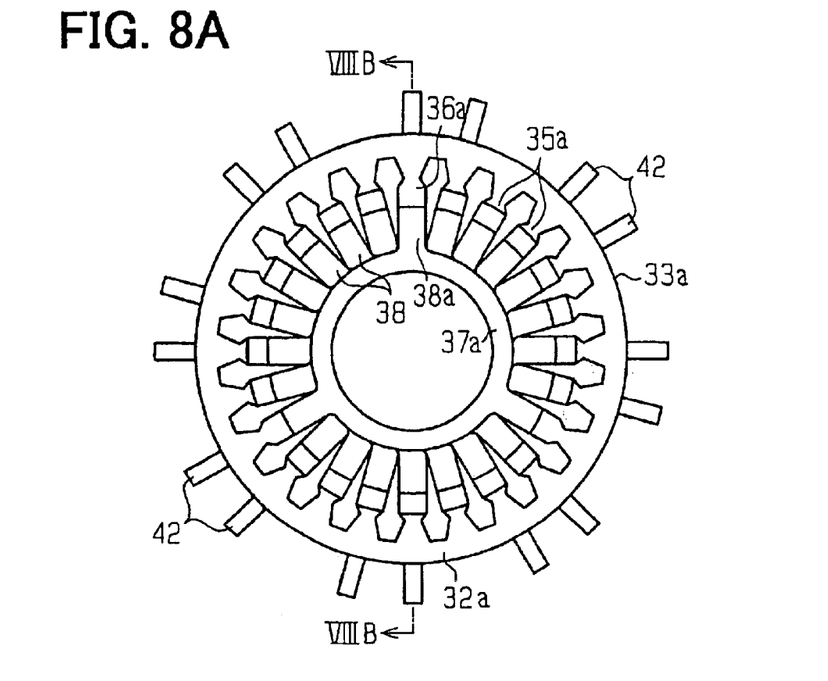
FIG. 8A is a plan view of the assembled commutator before filling of the resin.
Figure 8B:
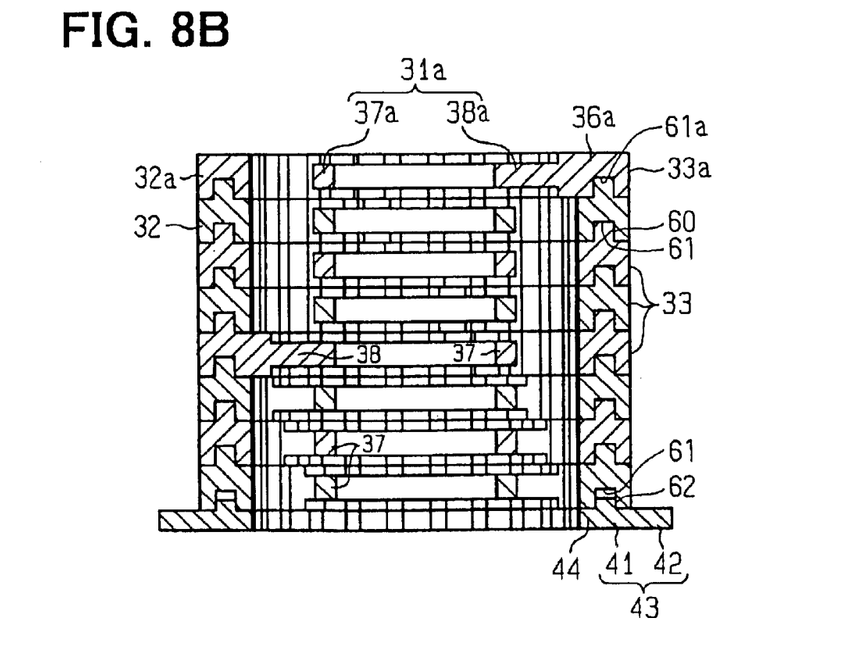
FIG. 8B is a cross sectional view along line VIIIB—VIIIB in FIG. 8A.

With reference to FIGS. 8A and 8B in connection with FIG. 3, the blank plate members 33, 33a are stacked up as follows. A top one of each adjacent two blank plate members 33, 33a is displaced in a clockwise direction by a predetermined angle (15 degrees in this embodiment) from a lower one of the blank plate members 33 in FIGS. 8A and 8B. Here, the predetermined angle corresponds to an angular interval of the commutator segments 1–24 and is obtained by the following equation.

The predetermined angle=360 degrees×1/the number of commutator segments

At this time, as shown in FIG. 4, each projection 60 of a lower one of each adjacent two blank plate members 33 of the first type is press fitted into an opposed one of the recesses 61 of an upper one of the two blank plate members 33. Furthermore, each projection 60 of the top end one of the blank plate members 33 of the first type is press fitted into an opposed one of the recesses 61a of the blank plate member 33a of the second type. In this way, the blank plate members 33, 33a are secured together.

Figure 7A:
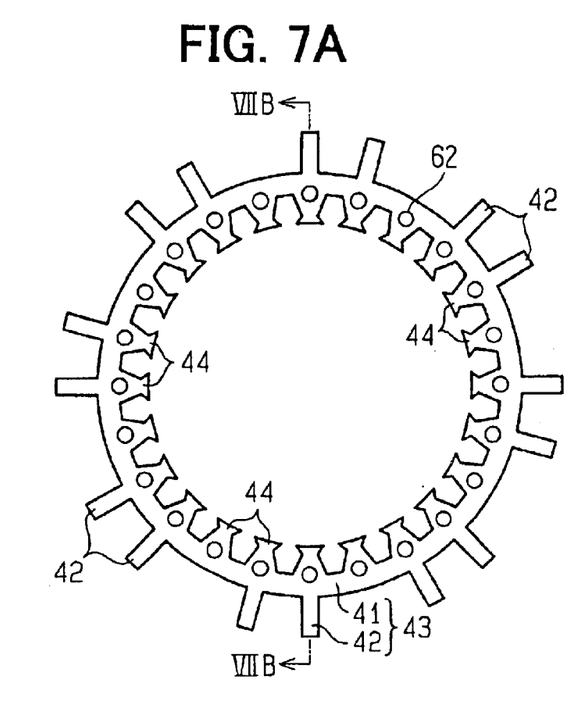
FIG. 7A is a plan view of a connecting plate member of the commutator.
Figure 7B:
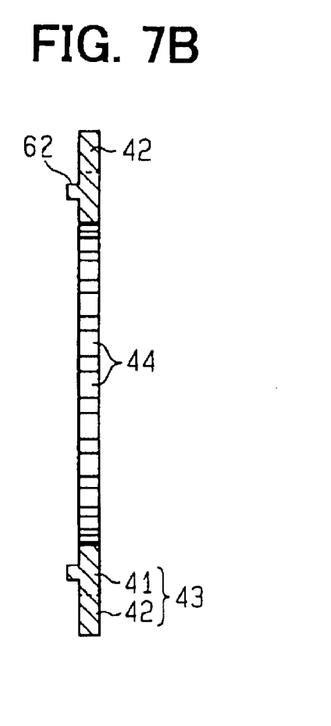
FIG. 7B is a cross sectional view along line VIIB—VIIB in FIG. 7A.

With reference to FIGS. 3 and 4, the lowest one of the blank plate members 33 of the first type is stacked over the connecting plate member 43. The connecting plate member 43 includes the annular part 41 and a plurality of connectors 42. The connectors 42 project radially outward from an outer peripheral surface of the annular part 41. Ends of the coils M1–M8 are connected to the connectors 42. Similar to the anchoring portions 35, 35a of the blank plate members 33, 33a, twenty four anchoring portions 44 are formed at equal angular intervals in an inner peripheral region of the annular part 41 of the connecting plate member 43. As shown in FIGS. 7A and 7B, a circumferential center of each connector 42 and a circumferential center of a radially opposed one of the anchoring portions 44 coincide with one another and are thus located along a corresponding imaginary radial line (not shown), which extends from a center of the annular part 41 of the connecting plate member 43. Similar to the projections 60 of the blank plate members 33 of the first type, twenty four axial projections 62 are provided in a top surface of the connecting plate member 43 in FIG. 4. The projections 62 are arranged at equal angular intervals and are provided to the anchoring portions 44, respectively. When the connecting plate member 43 is placed below the lowest one of the blank plate members 33 of the first type, the anchoring portions 44 of the connecting plate member 43 are axially aligned with the corresponding anchoring portions 35, 35a, 36, 36a of the blank plate members 33, 33a. Then, the projections 62 of the connecting plate member 43 are press fitted into the recesses 61 of the adjacent blank plate member 33 of the first type.

Thereafter, liquid resin 34 (FIG. 4), which serves as the dielectric material, is filled in the space defined radially inward of the annular parts 32, 32a of the blank plate members 33, 33a and radially inward of the annular part 41 of the connecting plate member 43 in a filling process. At this time, as shown in FIG. 4, a through hole 34a is formed in the center of the resin 34 using a molding die arrangement (not shown). In FIG. 4, although the solidified resin 34 is depicted, the resin 34 in the liquid phase is also indicated by the numeral 34. After the solidification of the resin 34, the annular parts 32, 32a of the blank plate members 33, 33a and the annular part 41 of the connecting plate member 43 are radially cut in a cutting process at the plurality of predetermined cut points (twenty four cut points in the present embodiment) indicated by the dot-dot dash lines in FIG. 3 and are thus divided into the plurality of portions (twenty four portions) to form the commutator segments 1–24. The cut points of the annular part 32, 32a of each blank plate member 33, 33a are circumferentially displaced from the anchoring portions 35, 36 to avoid cutting of the anchoring portions 35, 36. Similarly, the cut points of the annular part 41 of the connecting plate member 43 are circumferentially displaced from the anchoring portions 44 to avoid cutting of the anchoring portions 44. Although FIG. 3 shows the commutator S before the filling process and the cutting process, the portions, which become the commutator segments 1–24, are also indicated by the same numerals 1–24.

An outer surface (outer peripheral surface) of each commutator segment 1–24 is polished in a manner that minimizes formation of steps in the outer peripheral surface of the commutator S. More specifically, the outer surface of each commutator segment 1–24 is polished in such a manner that the outer surfaces of the commutator segments 1–24 substantially extend along a single imaginary circle, and formation of steps in the commutator segments 1–24 in the axial direction of the commutator S is minimized to provide the smooth outer peripheral surface.

In the commutator S manufactured in the above-described manner, the commutator segments 1–24 are divided into the groups, and the commutator segments of each group (e.g., the segments 1, 9, 17 of one group, the segments 5, 13, 21 of another group and so on) are short-circuited together by the corresponding short-circuiting part 31, 31a, i.e., are electrically connected together by the corresponding short-circuiting part 31, 31a. Thus, for example, as shown in FIG. 2, electric current is supplied not only to contacting commutator segments 6, 7, 18, 19, which directly contact one of the anode-side power supply brush B1 and the cathode-side power supply brush B2, but also to non-contacting commutator segments 2, 3, 10, 11, 14, 15, 22, 23, which do not directly contact any of the brushes B1, B2 but are connected to a corresponding one of the contacting commutator segments 6, 7, 18, 19 through the corresponding short-circuiting part 31, 31a. Thus, while reducing the number of brushes B1, B2, electric current can be simultaneously supplied to the greater number of coils M1–M8.

Next, advantages of the above embodiment will be described.

(1) The blank plate members 33, 33a (FIGS. 5A–6B), each of which includes the annular part 32, 32a and the short-circuiting part 31, 31a, are stacked up in the axial direction of the commutator S. The resin 34, which serves as the dielectric material, is arranged in the space defined radially inward of the annular parts 32, 32a of the blank plate members 33, 33a. Then, the annular parts 32, 32a of the blank plate members 33, 33a are cut at the circumferential cut points (twenty four points) and are thus divided into the portions (twenty four portions) to form the commutator segments 1–24. Here, the short-circuiting parts 31, 31a are arranged radially inward of the commutator segments 1–24. Thus, unlike the prior art (e.g., Japanese Unexamined Patent Publication No. 2001-320862), an increase in the axial length of the commutator S can be avoided. Furthermore, only two types of blank plate members 33, 33a are used. Thus, the number of types of components of the commutator S can be reduced in comparison to the prior art (e.g., Japanese Unexamined Patent Publication No. 11-187622). Furthermore, the manufacturing costs of the components of the commutator S can be reduced, and the assembling operation can be simplified. Also, the assembling costs of the commutator S can be reduced.

(2) Each of the blank plate members 33, 33a and the connecting plate member 43 is secured by stacking the blank plate members 33, 33a and the connecting plate member 43 and press fitting the projections 60, 62 of one plate member 33, 33a, 43 into the corresponding recesses 61, 61a of the adjacent plate member 33, 33a, 43. Thus, a dedicated separate securing member is not required to secure the blank plate members 33, 33a and the connecting plate member 43 together. As a result, the number of components of the commutator S can be minimized.

(3) Each anchoring portion 35, 35a, 36, 36a, 44 which is anchored to the resin 34, is formed in the inner radial part of the corresponding commutator segment 1–24. Thus, when each anchoring portion 35, 35a, 36, 36a, 44 is anchored to the resin 34, the commutator segments 1–24 can be secured without requiring any other securing means for securely holding the commutator segments 1–24. This allows minimization of the number of components of the commutator S.

(4) The outer surface (outer peripheral surface) of each commutator segment 1–24 is polished to minimize the formation of steps. Thus, the commutator S can achieve relatively smooth slide engagement with the anode-side power supply brush B1 and the cathode-side power supply brush B2. In other words, it is possible to restrain jumping of the power supply brushes B1, B2 (i.e., momentarily lifting of the power supply brushes B1, B2) from the commutator segments 1–24 at the time of slide movement of the brushes B1, B2 along the commutator segments 1–24 of the rotating commutator S. Thus, generation of vibrations and noise from the commutator S can be minimized.

(5) The lowest one of the blank plate members 33 of the first type is stacked over the connecting plate member 43 that includes the annular part 41 and the connectors 42, which project from the outer peripheral surface of the annular part 41 and to which the ends of the coils M1–M8 are engaged. Thus, at the time of cutting process, in which the annular parts 32, 32a of the blank plate members 33, 33a are cut at the circumferential cut points (twenty four points) and are thus divided into the portions to form the commutator segments 1–24, the annular part 41 of the connecting plate member 43 are also simultaneously, advantageously cut at the circumferential cut points and are thus divided into the portions to form the commutator segments 1–24 and the connectors 42.

(6) The short-circuiting part 31, 31a of each blank plate member 33, 33a includes the small diameter portion 37, 37a and the connecting portions 38, 38a. The outer diameter of the small diameter portion 37, 37a is smaller than the inner diameter of the annular part 32, 32a of the blank plate member 33, 33a. Furthermore, the connecting portions 38, 38a extend radially outward from the small diameter portion 37, 37a and are connected to the inner peripheral surface of the annular part 32, 32a. Since the small diameter portion 37, 37a has the annular shape, it is possible to form the through hole 34a in the center of the commutator S to receive the rotatable shaft 106 of the motor 100. Therefore, the commutator S can be easily secured to the rotatable shaft 106 of the motor 100. Furthermore, as in the case of the present embodiment, when three or more circumferentially, equally spaced connecting portions 38, 38a are provided in each short-circuiting part 31, 31a and are connected to the small diameter portion 37, 37a of the short-circuiting part 31, 31a, the short-circuiting part 31, 31a can withstand the radial force to restrain radial deformation of the short-circuiting part 31, 31a. Particularly, when a relatively large load is applied to the short-circuiting part 31, 31a in the filling process for filling the resin 34, radial deformation of the short-circuiting part 31, 31a can be restrained to restrain contact of the short-circuiting part 31, 31a to the adjacent short-circuiting part 31, 31a.

(7) As shown in FIGS. 5B and 6B, the axial thickness of the short-circuiting part 31, 31a of each blank plate member 33, 33a is smaller than the axial thickness of the annular part 32, 32a of the blank plate member 33, 33a. Thus, even when the blank plate member 33, 33a is simply stacked up, the adjacent short-circuiting parts 31, 31a do not contact with one another and are thus electrically insulated from one another without requiring any insulating means (such as an insulating sheet interposed between the adjacent short-circuiting parts 31, 31a). As a result, the number of components of the commutator S can be advantageously minimized.

The above embodiment can be modified as follows.

Figure 9A:
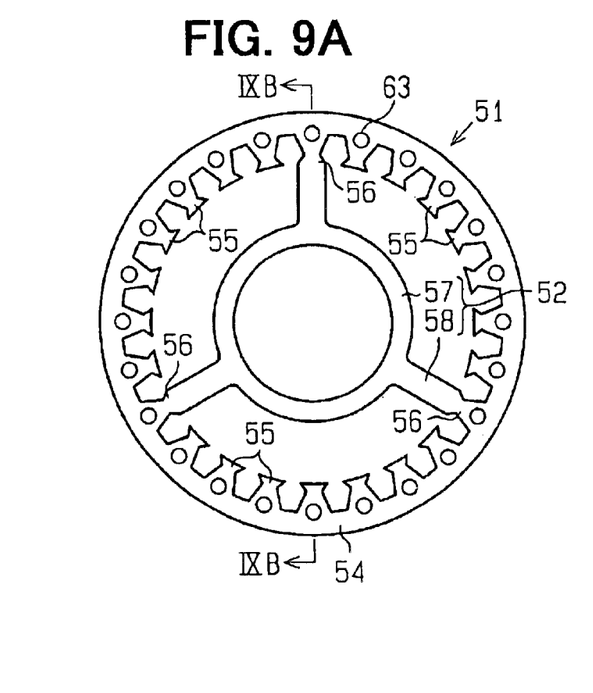
FIG. 9A is a plan view showing a modification of the blank plate member of the first type.
Figure 9B:
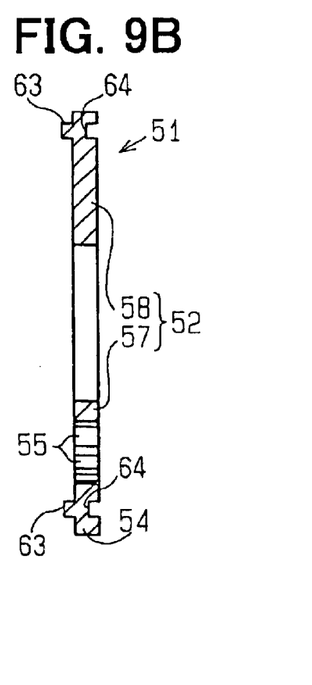
FIG. 9B is a cross sectional view along line IXB—IXB in FIG. 9A.
Figure 10A:
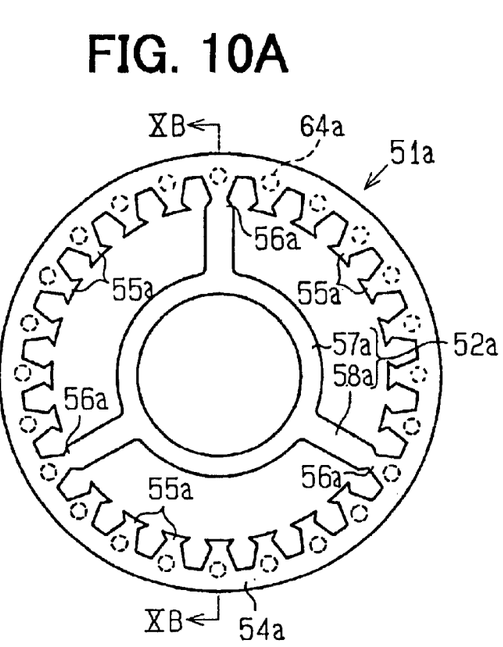
FIG. 10A is a plan view showing a modification of the blank plate member of the second type.
Figure 10B:
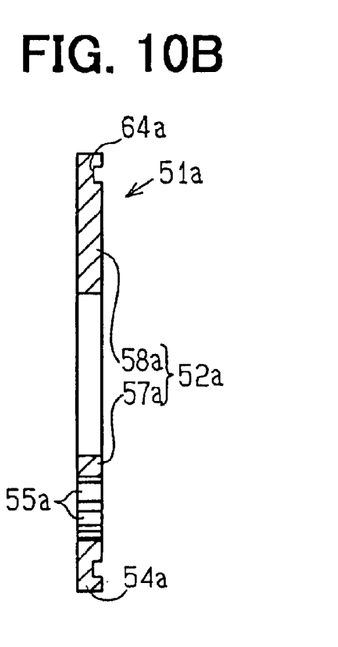
FIG. 10B is a cross sectional view along line XB—XB in FIG. 10A.
Figure 11A:
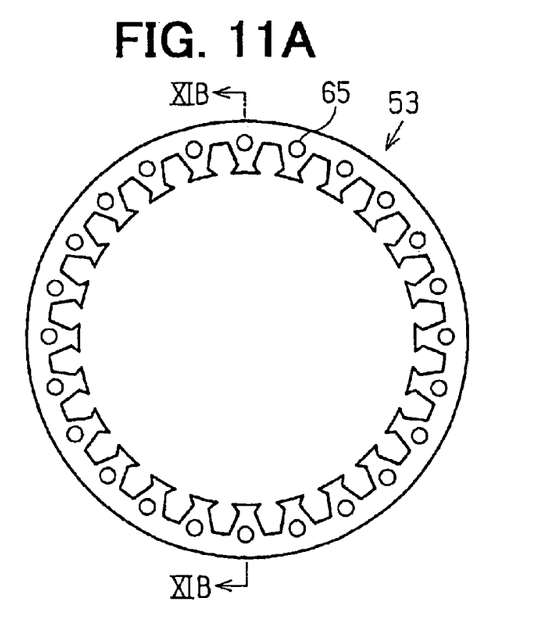
FIG. 11A is plan view showing a conductive spacer plate member used in a modification of the embodiment.
Figure 11B:
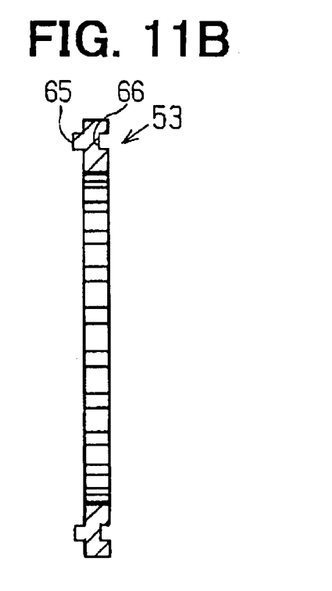
FIG. 11B is a cross sectional view along line XIB—XIB in FIG. 11A.

In the above embodiment, the axial thickness of the short-circuiting part 31, 31a of each blank plate member 33, 33a is made smaller than the axial thickness of the annular part 32, 32a of the blank plate member 33, 33a. Alternatively, the axial thickness of the short-circuiting part 31, 31 of each blank plate member 33, 33a can be made equal to the axial thickness of the annular part 32, 32a of the blank plate member 33, 33a. This feature is illustrated in FIGS. 9A–10B. With reference to FIGS. 9A and 9B, in place of the blank plate member 33 of the first type, a blank plate member 51 of a first type is provided. Here, an axial thickness of a short-circuiting part 52 of each blank plate member 51 is equal to an axial thickness of an annular part 54 of the blank plate member 51. Similar to the axial projections 60 and the axial recesses 61 of the above embodiment, axial projections 63 and axial recesses 64 are provided in the annular part 54. With reference to FIGS. 10A and 10B, in place of the blank plate member 33a of the second type, a blank plate member 51a of a second type is provided. Here, an axial thickness of a short-circuiting part 52a of each blank plate member 51a of a second type is equal to an axial thickness of an annular part 54a of the blank plate member 51a. Similar to the axial recesses 61a of the above embodiment, axial recesses 64a are provided in the annular part 54a. Furthermore, in this instance, an annular conductive spacer plate member 53 shown in FIGS. 11A and 11B is provided between each adjacent two blank plate members 51, 51a, which are stacked up in the axial direction of the commutator S. The spacer plate member 53 axially separates the short-circuiting parts 52, 52a of the adjacent blank plate members 51, 51a.

With reference to FIGS. 9A–10B, similar to the anchoring portions 35, 36, twenty four anchoring portions 55, 55a, 56, 56a are formed in an inner peripheral region of the annular part 54, 54a of each blank plate member 51, 51a. The short-circuiting part 52, 52a includes an annular small diameter portion 57, 57a and a plurality (three in this instance) of connecting portions 58, 58a. An outer diameter of the small diameter portion 57, 57a is smaller than an inner diameter of the annular part 54, 54a. Each connecting portion 58, 58a extends radially outward from the small diameter portion 57, 57a and is connected to the inner peripheral surface of the annular portion 54, 54a. With reference to FIGS. 11A and 11B, the spacer plate member 53 has a shape that is substantially the same as that of the blank plate member 51 without the short-circuiting part 52. Furthermore, unlike the blank plate member 51, the spacer plate member 53 has axial recesses 66 similar to the recesses 61 of the blank plate member 33 in addition to axial projections 65 similar to the projections 60 of the blank plate member 33.

Figure 12:
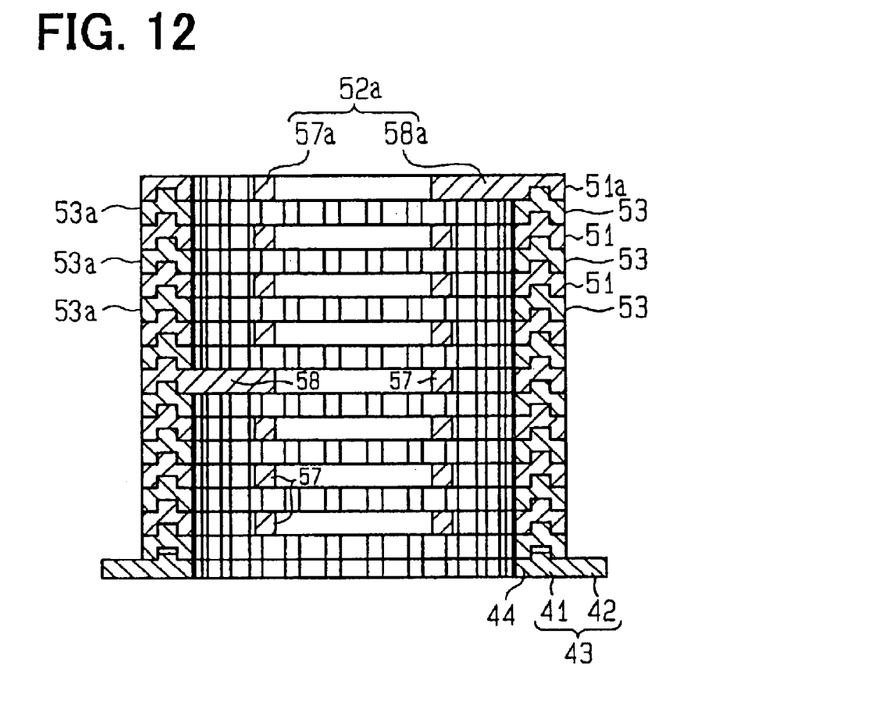
FIG. 12 is a cross sectional view showing the modification.

As shown in FIG. 12, the blank plate members 51, 51a are stacked up such that one of the blank plate members 51, 51a is displaced in a clockwise direction by a predetermined angle (15 degrees in this embodiment) from an adjacent lower one of the blank plate members 51. Here, the predetermined angle corresponds to an angular interval of the commutator segments 1–24 and is obtained by the following equation.

The predetermined angle=360 degrees×1/the number of commutator segments

Furthermore, at the time of stacking the blank plate members 51, 51a, each spacer plate member 53 is placed between corresponding two blank plate members 51, 51a. Also, similar to the above embodiment, the connecting plate member 43 is secured to the lowest one of the blank plate members 51 of the first type in a manner similar to that of the above embodiment. Then, resin (not shown) is provided in a space defined radially inward of the annular parts 54, 54a of the blank plate members 51, 51a and also radially inward of the spacer plate members 53 and of the connecting plate member 43. The annular parts 54, 54a of the blank plate members 51, 51a, the spacer plate members 53 and the annular part 41 of the connecting plate member 43 are radially cut at a plurality of predetermined cut points (twenty four points in this instance) and are thus divided into a plurality (twenty four in this instance) of portions to form the commutator segments in a manner similar to one described above. When each spacer plate member 53 is cut into the corresponding portions, these portions of the spacer plate member 53 serve as spacer elements 53a, each of which is interposed between corresponding two of the divided portions of the blank plate members 51, 51a and of the connecting plate member 43.

Even with this modification, advantages similar to those discussed in the above described sections (1)–(6) can be achieved. Furthermore, since the axial thickness of each blank plate member 51, 51a is uniform throughout the blank plate member 51, 51a, the blank plate member 51 can be, for example, blanked out from a plate material, which includes no stepped portion and has a uniform thickness throughout the plate material. This allows easy manufacturing of the blank plate members 51, 51a.

In the above embodiment, each blank plate member 33, 33a and the connecting plate member 43 are stacked up and are connected together through engagement between the projections 60, 62 and the recesses 61, 61a. However, any other method, such as welding, can be used to connect them together. Even with this modification, advantages similar to those discussed in the above described sections (1) and (3)–(7) can be achieved.

In the above embodiment, the connecting plate member 43, which has the connectors 42 to be connected to the coils M1–M8, is secured to the lowest one of the blank plate members 33. However, as long as the commutator S has the connectors to be connected to the coils M1–M8, the above arrangement can be modified in any appropriate manner. For example, the connectors to be connected to the coils can be provided to one (e.g., the lowest one in FIG. 6) of the blank plate members. With this modification, one plate member (i.e., the connecting plate member) can be eliminated from the commutator S.

In the above embodiment, the short-circuiting part 31, 31a includes the annular small diameter portion 37, 37a and the connecting portions 38, 38a, and each connecting portion 38, 38a extends radially outward from the small diameter portion 37, 37a and is connected to the inner peripheral surface of the annular part 32, 32a. However, as long as the predetermined commutator segments of the corresponding group (e.g., the segments 1, 9, 17 of one group, the segments 5, 13, 21 of another group and so on) are are electrically connected together to short-circuit therebetween, each short-circuiting part 31, 31a can be changed to any other appropriate shape. For example, the annular small diameter portion 37, 37a can be changed to an arcuate portion, which is formed by removing a portion of a ring. Even with this modification, advantages similar to those discussed in the above described sections (1)–(5) and (7) can be achieved.

In the above embodiment, the number of commutator segments 1–24 is twenty four. However, the number of commutator segments 1–24 can be changed to any appropriate number. Furthermore, each group of commutator segments (e.g., the group of commutator segments 1, 9, 17 or the group of commutator segments 5, 13, 21) includes three commutator segments. However, the number of commutator segments in each group can be changed to any other appropriate number.

Figure 13:
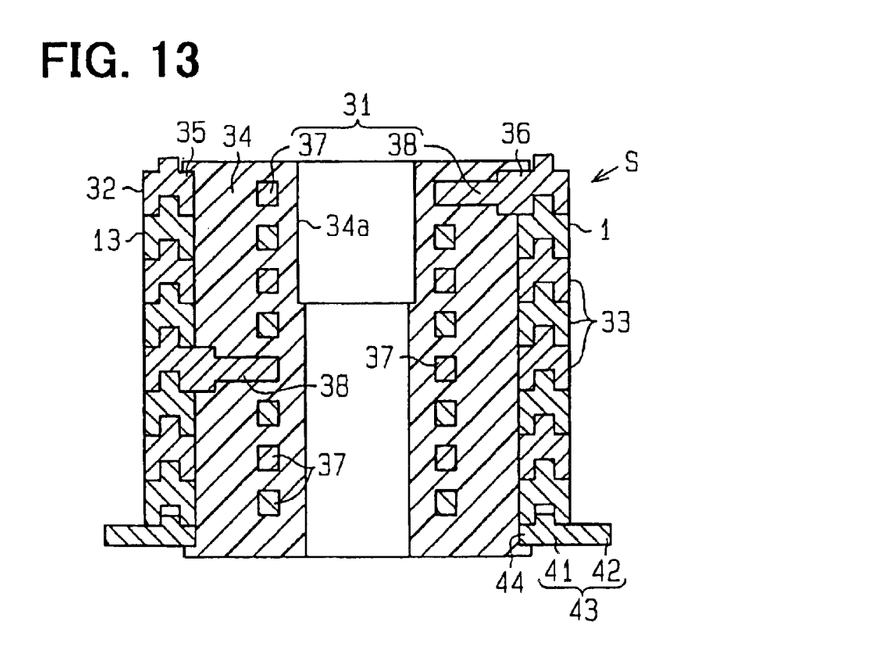
FIG. 13 is a cross sectional view showing another modification.

In the above embodiment, the commutator S includes the blank plate member 33a of the second type. However, in place of the blank plate member 33a of the second type, another blank plate member 33 of the first type can be provided, as shown in FIG. 13. Even with this modification, advantages similar to those discussed in the above described sections (1)–(7) can be achieved.

Additional advantages and modifications will readily occur to those skilled in the art. The invention in its broader terms is therefore not limited to the specific details, representative apparatus, and illustrative examples shown and described.

What is claimed is:

1. A commutator for an electric motor that includes a plurality of power supply brushes, which are slidably engaged with the commutator, the commutator comprising:

a plurality of conductive commutator segments, which are arranged at generally equal angular intervals in a circumferential direction of the commutator, wherein the commutator segments are divided into a plurality of groups, each of which includes two or more of the commutator segments;

a plurality of generally planar short-circuiting parts, which are respectively provided to the groups of the commutator segments and are located radially inward of the commutator segments in such a manner that the short-circuiting parts are spaced one after the other in an axial direction of the commutator, wherein each short-circuiting part is seamlessly and integrally formed with and is electrically connected to at least a portion of each commutator segment of a corresponding one of the groups of the commutator segments, and at least one of the short-circuiting parts is located within an axial extent of at least one of the power supply brushes measured in the axial direction of the commutator; and a dielectric body, which securely holds each commutator segment and each short-circuiting part.

2. The commutator according to claim 1, wherein the commutator segments of each group are arranged at generally equal angular intervals in the circumferential direction of the commutator.

3. The commutator according to claim 1, wherein the short-circuiting parts are displaced from one another by a predetermined angle in the circumferential direction of the commutator.

4. The commutator according to claim 3, wherein the predetermined angle is defined by the following equation:

the predetermined angle=360 degrees×1/the number of commutator segments.

5. The commutator according to claim 1, wherein:

each commutator segment includes a plurality of sub-elements, which are stacked in the axial direction of the commutator; and each sub-element is located in a corresponding imaginary plane, which is perpendicular to the axial direction of the commutator, and in which a corresponding one of the short-circuiting parts extends.

6. The commutator according to claim 5, further includes a plurality of conductive spacer elements, wherein each of the spacer elements is interposed between corresponding two of the sub-elements in the axial direction of the commutator.

7. The commutator according to claim 5, wherein:

an engaging surface of one of each adjacent two of the sub-elements of each commutator segment has one of an axial recess and an axial projection, wherein the axial projection is press fitted into the axial recess; and an engaging surface of the other one of the adjacent two of the sub-elements, which is engaged with the engaging surface of the one of the adjacent two of the sub-elements, has the other one of the axial recess and the axial projection.

8. The commutator according to claim 1, wherein:

each short-circuiting part has an annular small diameter portion and a plurality of connecting portions, wherein the connecting portions extend radially outward from the annular small diameter portion; and each connecting portion of the short-circuiting part is connected to a corresponding one of the commutator segments of the corresponding one of the groups of the commutator segments.

9. The commutator according to claim 1, further comprising a plurality of connectors, to which armature winding coils of the motor are connected.

10. The commutator according to claim 1, wherein each commutator segment includes a plurality of sub-elements, which are stacked continuously one after another in the axial direction of the commutator.

11. The commutator according to claim 10, wherein an axial thickness of each short-circuiting part measured in the axial direction of the commutator is smaller than an axial thickness of each sub-element measured in the axial direction of the commutator.

12. An electric motor comprising:

a stator that includes a plurality of field poles; and a rotor that is rotatable relative to the field poles and includes a commutator; and a plurality of power supply brushes, which are slidably engaged with the commutator, wherein the commutator includes:

a plurality of conductive commutator segments, which are arranged at generally equal angular intervals in a circumferential direction of the commutator, wherein the commutator segments are divided into a plurality of groups, each of which includes two or more of the commutator segments;

a plurality of generally planar short-circuiting parts, which are respectively provided to the groups of the commutator segments and are located radially inward of the commutator segments in such a manner that the short-circuiting parts are spaced one after the other in an axial direction of the commutator, wherein each short-circuiting part is seamlessly and integrally formed with and is electrically connected to at least a portion of each commutator segment of a corresponding one of the groups of the commutator segments, and at least one of the short-circuiting parts is located within an axial extent of at least one of the power supply brushes measured in the axial direction of the commutator; and a dielectric body, which securely holds each commutator segment and each short-circuiting part.

13. The electric motor according to claim 12, wherein each commutator segment includes a plurality of sub-elements, which are stacked continuously one after another in the axial direction of the commutator.

14. The electric motor according to claim 13, wherein an axial thickness of each short-circuiting part measured in the axial direction of the commutator is smaller than an axial thickness of each sub-element measured in the axial direction of the commutator.

* * * * *